United States Patent Office.

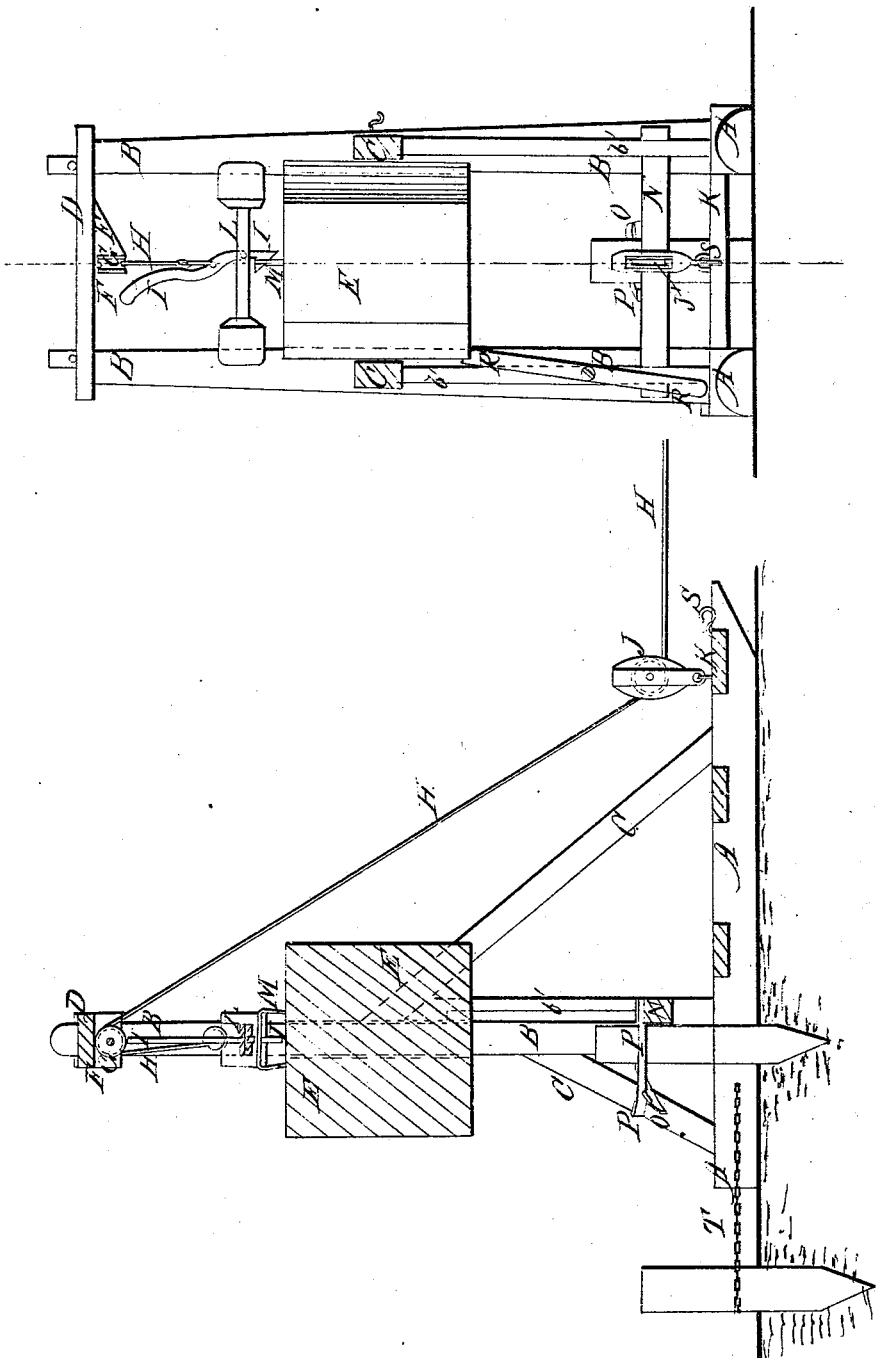

C. T. FITCH, OF HARBOR CREEK, PENNSYLVANIA.

*Letters Patent No. 64,514, dated May 7, 1867.*

---

IMPROVED POST-DRIVING MACHINE.

---

*The Schedule referred to in these Letters Patent and making part of the same.*

---

TO ALL WHOM IT MAY CONCERN:

Be it known that I, C. T. FITCH, of Harbor Creek, in the county of Erie, and State of Pennsylvania, have invented a new and improved Post-Driving Machine; and I do hereby declare that the following is a full, clear, and exact description thereof, which will enable others skilled in the art to make and use the same, reference being had to the accompanying drawings, forming part of this specification, in which—

Figure 1 is a vertical section of my improved machine, taken through the line $x\ x$, fig. 2.

Figure 2 is a front view of the same partly in section to show the construction.

Similar letters of reference indicate like parts.

My invention has for its object to furnish a cheap and convenient machine for driving fence and other posts; and it consists in the hook and sliding guide-bar, in combination with the posts and hammer, in the adjustable arms and sliding bar for holding the post while being driven, and in the stop-lever for holding the hammer while the machine is being drawn from place to place.

A are the runners, upon which the machine is supported and drawn from place to place, the forward ends of which are bevelled or rounded off, as shown in the drawings, for convenience in drawing it. B are the posts of the machine, the lower ends of which are securely attached to the runners A, and which are further secured in an upright position by the braces C, as shown in fig. 1. The upper ends of the posts B are connected and held in their proper relative positions by the cross-bar D attached to their upper ends. E is the hammer, the sides of which are grooved so as to fit and slide up and down upon the posts B. To the under side of the cross-bar D are attached blocks F, the lower sides of which are inclined, as shown in fig. 2, and between which is pivoted the pulley G, over which the rope H passes. One end of the rope H is attached to the hook I, and the other end passes over a pulley, J, attached to the front cross-bar K that connects the runners A, and is attached to the staple of the whiffle-tree. The hook I is made in substantially the shape shown in fig. 2, and it is pivoted in a slot in the guide-bar L, to the ends of which are attached or upon them are formed blocks having grooves fitting and sliding upon the posts B, so as to always hold the hook I in proper position for taking hold of the staple M attached to the upper end of the hammer E. The post while being driven is held against the sliding bar N by the adjustable arms O and P, one end of which is pivoted to the bar N. The other end of the arm O has several notches formed in it, into one or the other of which the end of the other arm P is placed, according to the size of the post being driven. The bar N slides up and down in grooves formed upon the sides of the posts B by attaching cleats $b'$ to them, as shown in figs. 1 and 2. R is a stop-lever, pivoted to the side of one of the posts B, and which has a notch formed in its upper end to receive and hold the hammer E while the machine is being transported from place to place. In drawing the machine the staple of the whiffle-tree is hooked upon the hook S, attached to the front cross-bar K. T is a measuring chain, one end of which is attached to one of the runners A of the machine. The chain T should be made of links and rings, the rings being placed a foot apart, so that by passing the said chain around the post last driven and drawing the machine forward it will be stopped at the proper place for driving the next post.

What I claim as new, and desire to secure by Letters Patent, is—

The combination of the runners A, posts B, and braces C, with the hook I, inclined blocks F, sliding guide-bar L, hammer E, adjustable arms O and P, sliding bar N, and stop-lever R, substantially as herein set forth for the purpose specified.

C. T. FITCH.

Witnesses:
W. F. HALDEMAN,
C. A. HITCHCOCK.